United States Patent
Miyoshi et al.

(10) Patent No.: US 12,191,532 B2
(45) Date of Patent: Jan. 7, 2025

(54) ELECTRODE PLATE, ELECTRODE BODY, AND BATTERY

(71) Applicant: Panasonic Intellectual Property Management Co., Ltd., Osaka (JP)

(72) Inventors: Yoshihiro Miyoshi, Osaka (JP); Yoshinori Sakai, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/752,173

(22) Filed: May 24, 2022

(65) Prior Publication Data

US 2022/0285798 A1    Sep. 8, 2022

Related U.S. Application Data

(63) Continuation of application No. 17/040,762, filed as application No. PCT/JP2019/007177 on Feb. 26, 2019, now abandoned.

(30) Foreign Application Priority Data

Apr. 6, 2018 (JP) ................. 2018-074154

(51) Int. Cl.
*H01M 50/538* (2021.01)
*H01M 4/02* (2006.01)
(Continued)

(52) U.S. Cl.
CPC ....... *H01M 50/538* (2021.01); *H01M 4/0402* (2013.01); *H01M 4/0471* (2013.01);
(Continued)

(58) Field of Classification Search
None
See application file for complete search history.

(56) References Cited

U.S. PATENT DOCUMENTS

| 6,051,338 A | 4/2000 | Miyazaki et al. |
| 6,315,801 B1 | 11/2001 | Miyazaki et al. |
| 6,469,729 B1 * | 10/2002 | Ryan ............ B23K 26/04 347/256 |

(Continued)

FOREIGN PATENT DOCUMENTS

| CN | 1728419 A | 2/2006 |
| CN | 101471437 A | 7/2009 |

(Continued)

OTHER PUBLICATIONS

Singh, Madhusudan, et al. "Inkjet printing—process and its applications." Advanced materials 22.6 (2010): 673-685 (Year: 2010).*

(Continued)

*Primary Examiner* — Matthew T Martin
*Assistant Examiner* — Grace Ann Kenlaw
(74) *Attorney, Agent, or Firm* — WHDA, LLP

(57) ABSTRACT

This electrode plate has a band-shaped core, and an active material layer formed on both surfaces of the core, and a current collector lead is connected to an exposed part at which the core is exposed. The exposed part is placed on the longitudinal direction portion of the core, and an identification display part that can specify the history of the manufacturing process is formed at a position different from the current collector lead in the exposed part. In the core, the active material layer is placed at a position on the opposite side to the identification display part in the core thickness direction.

14 Claims, 4 Drawing Sheets

(51) Int. Cl.
    *H01M 4/04*       (2006.01)
    *H01M 10/04*     (2006.01)
    *H01M 50/534*    (2021.01)
    *H01M 50/536*    (2021.01)

(52) U.S. Cl.
    CPC ... *H01M 10/0422* (2013.01); *H01M 10/0431* (2013.01); *H01M 50/534* (2021.01); *H01M 50/536* (2021.01); *H01M 2004/028* (2013.01)

(56) References Cited

U.S. PATENT DOCUMENTS

| | | | |
|---|---|---|---|
| 2006/0040181 | A1 | 2/2006 | Kim et al. |
| 2009/0166192 | A1* | 7/2009 | Ohashi .................. H01G 9/06 204/280 |
| 2012/0295145 | A1* | 11/2012 | Kim .................. H01M 50/534 429/94 |
| 2015/0295270 | A1* | 10/2015 | Chun .................. H01M 50/534 429/211 |
| 2016/0149221 | A1* | 5/2016 | Choi .................. H01M 50/534 429/211 |

FOREIGN PATENT DOCUMENTS

| | | | |
|---|---|---|---|
| JP | 10-64525 | A | 3/1998 |
| JP | 10-261439 | A | 9/1998 |
| JP | 2006-40875 | A | 2/2006 |
| JP | 2009-163929 | A | 7/2009 |
| JP | 2010-55906 | A | 3/2010 |
| JP | 2013-254561 | A | 12/2013 |
| JP | 2015100805 | A * | 6/2015 |
| JP | 2017-220356 | A | 12/2017 |
| JP | 6720516 | B2 * | 7/2020 |
| KR | 20180008037 | A * | 1/2018 |

OTHER PUBLICATIONS

International Search Report dated May 28, 2019, issued in counterpart International Application No. PCT/JP2019/007177. (2 pages).
English Translation of Chinese Search Report dated Jan. 18, 2023 for the related Chinese Patent Application No. 201980022863.X. (3 Pages).

* cited by examiner

ELECTRODE PLATE, ELECTRODE BODY, AND BATTERY

CROSS REFERENCE TO RELATED APPLICATIONS

This application is a Continuation of U.S. patent application Ser. No. 17/040,762, filed Sep. 23, 2020, which is a National Stage Entry of International Application No. PCT/JP2019/007177 filed Feb. 26, 2019, which claims the benefit of Japanese Patent Application No. 2018-074154 filed in the Japan Patent Office on Apr. 6, 2018, each of which is incorporated by reference herein in its entirety.

TECHNICAL FIELD

The present disclosure relates to an electrode plate, an electrode assembly, and a battery.

BACKGROUND ART

Batteries such as cylindrical non-aqueous electrolyte secondary batteries each comprise a wound electrode assembly including a positive electrode plate and a negative electrode plate spirally wound with a separator therebetween and are formed by the electrode assembly being received in an outer covering body. Respective current collector leads are connected to the positive electrode plate and the negative electrode plate, and the positive electrode plate and the negative electrode plate are connected to, e.g., a sealing assembly and an outer covering can via the current collector leads, respectively.

However, in a process of manufacturing a battery or after shipment of a battery, e.g., if a failure occurs for some reason and, for example, most of components of the battery are damaged by heat, it may be difficult to analyze a cause of the failure.

Patent Literature 1 describes that in an electrode assembly, an identification mark is provided on at least one of a positive electrode lead, a negative electrode lead, a positive electrode plain part in which no positive electrode active material is applied in an electrode current collector of a positive electrode plate and a negative electrode plain part in which no negative electrode active material is applied in an electrode current collector of a negative electrode plate. The identification mark is a mark that enables confirming manufacturing process history records. Most of components of the battery are severely deformed by high heat; however, the positive electrode lead, the negative electrode lead, and the electrode current collectors, which are each formed of a metal material, are hardly deformed. Consequently, at the time of occurrence of a problem in the battery, the manufacturing process history records can easily be confirmed using the identification mark, enabling easy analysis of a cause of the problem.

CITATION LIST

Patent Literature

PATENT LITERATURE 1: Japanese Unexamined Patent Application Publication No. 2006-40875

SUMMARY

In the configuration described in Patent Literature 1, the positive electrode lead and the negative electrode lead are small in width, and thus, it is difficult to form an identification mark part on the positive electrode lead or the negative electrode lead. Also, in the configuration described in Patent Literature 1, an identification mark may fail to be formed with high precision because of a decrease in stiffness of a part, on which the identification mark is formed, of the electrode current collectors of the positive electrode plate and the negative electrode plate. Consequently, at the time of occurrence of a failure, quick analysis of a cause of the failure based on the identification mark may fail to be performed because of difficulty in confirming the identification mark.

It is an advantage of the present disclosure to, in an electrode plate, an electrode assembly and a battery, enable, upon occurrence of a failure, quick analysis of a cause of the failure.

An electrode plate according to the present disclosure is an electrode plate having a band-like electrode current collector and an active material layer formed on each of opposite surfaces of the electrode current collector, a current collector lead being connected to an exposed part in which the electrode current collector is exposed, wherein: the exposed part is disposed in a part in a longitudinal direction of the electrode current collector; an identification mark part that enables identification of a manufacturing process history record is formed at a position in the exposed part, the position being different from that of the current collector lead; and on the electrode current collector, the active material layer is disposed at a position on an opposite side in a thickness direction of the electrode current collector from the identification mark part.

An electrode assembly according to the present disclosure is an electrode assembly comprising at least one first electrode plate and at least one second electrode plate that are wound with a separator therebetween, wherein the first electrode plate is the electrode plate according to the present disclosure.

A battery according to the present disclosure is a battery comprising the electrode assembly according to the present disclosure and a bottomed tubular outer covering can that receives the electrode assembly.

With the electrode plate, the electrode assembly and the battery according to the present disclosure, irrespective of stiffness of an electrode current collector of an electrode plate, an identification mark can easily be formed with high precision by an active material layer being disposed on the opposite side of the electrode plate from the identification mark. Consequently, at the time of occurrence of a failure, the identification mark can easily be confirmed, enabling quickly performing analysis of a cause of the failure based on the identification mark.

DESCRIPTION OF EMBODIMENTS

An embodiment of the present disclosure will be described in detail below with reference to the accompanying drawings. In the below description, specific shapes, materials, numeric values, directions, etc., are examples for ease of understanding of the present disclosure and may appropriately be changed according to the specifications of the electrode plate, the electrode assembly or the battery. Also, in the below, the term "substantially" is used for meaning including, for example, a case that can be regarded as substantially the same in addition to a case that is completely the same. Furthermore, where a plurality of embodiments and alterations are included in the below, it is originally assumed that feature parts of the embodiments and alterations are appropriately used in combination.

Also, in the below, a case where a battery is a cylindrical non-aqueous electrolyte secondary battery will be described; however, the battery is not limited to that of this case but may be another secondary battery or a primary battery.

Figure 1:
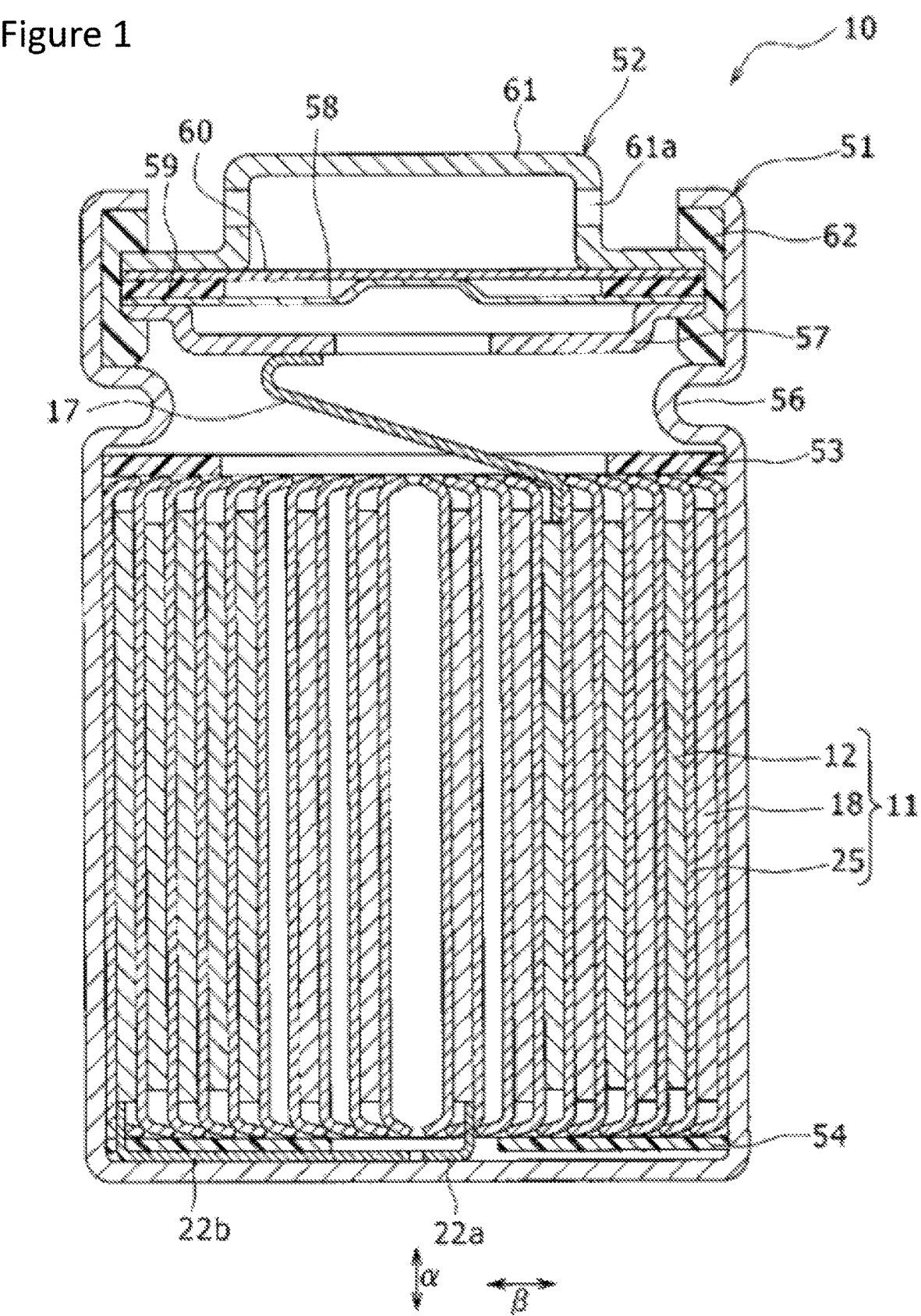
FIG. 1 is a sectional view of a battery according to an example of an embodiment.
Figure 2:
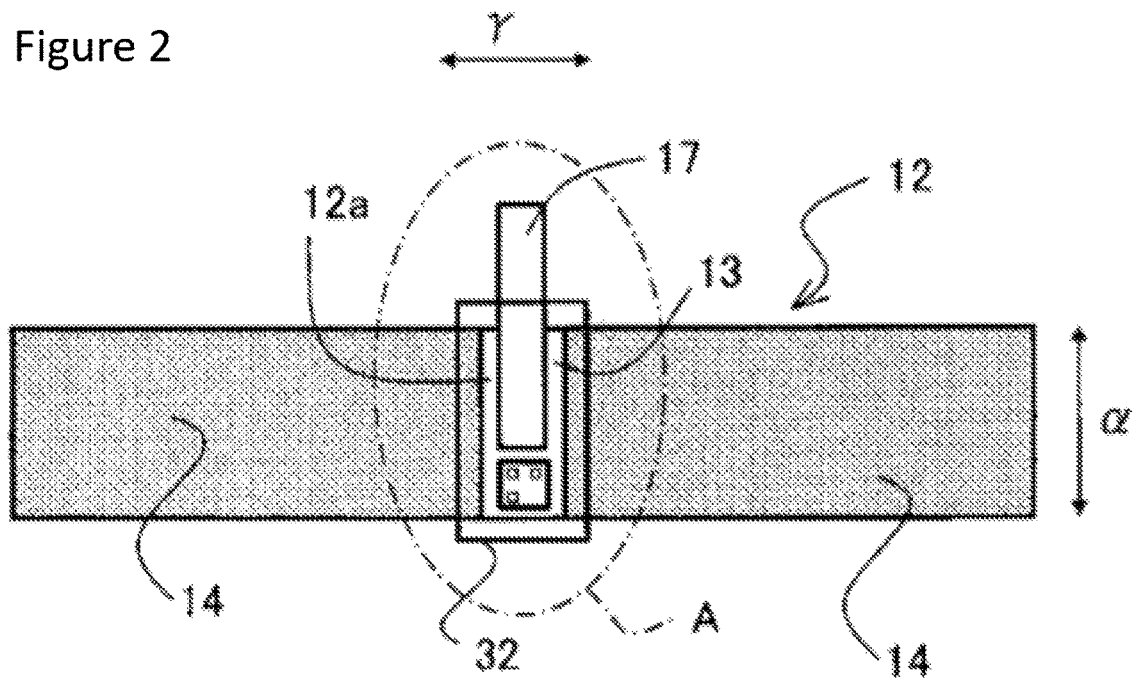
FIG. 2 is a diagram illustrating a positive electrode plate extracted from FIG. 1, in a developed state.
Figure 3:
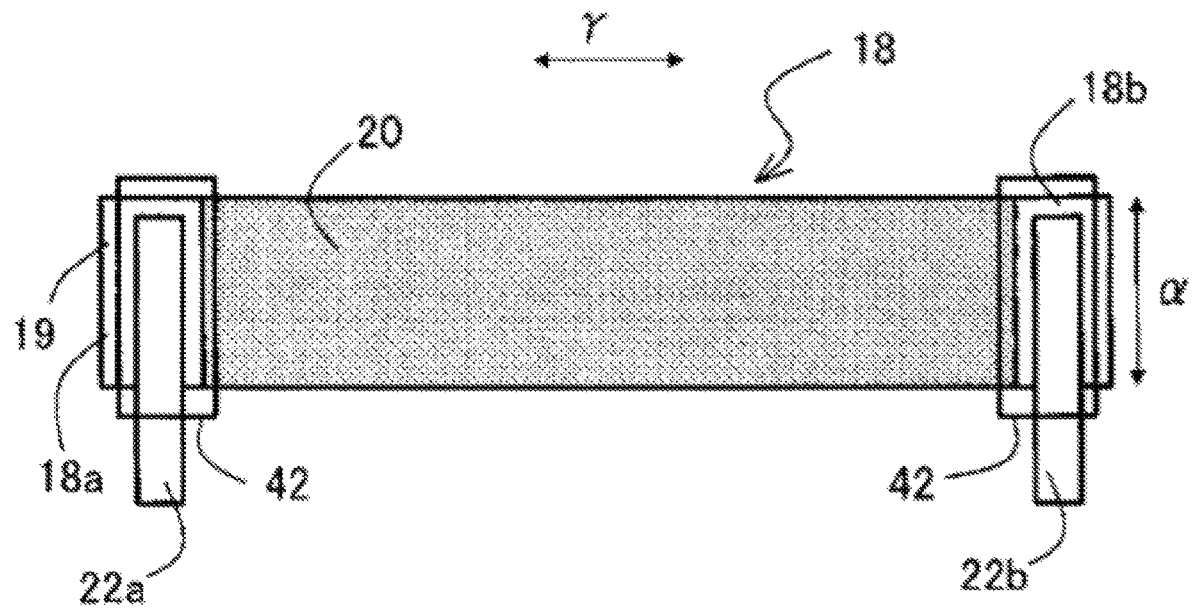
FIG. 3 is a diagram illustrating a negative electrode plate extracted from FIG. 1, in a developed state.
Figure 4:
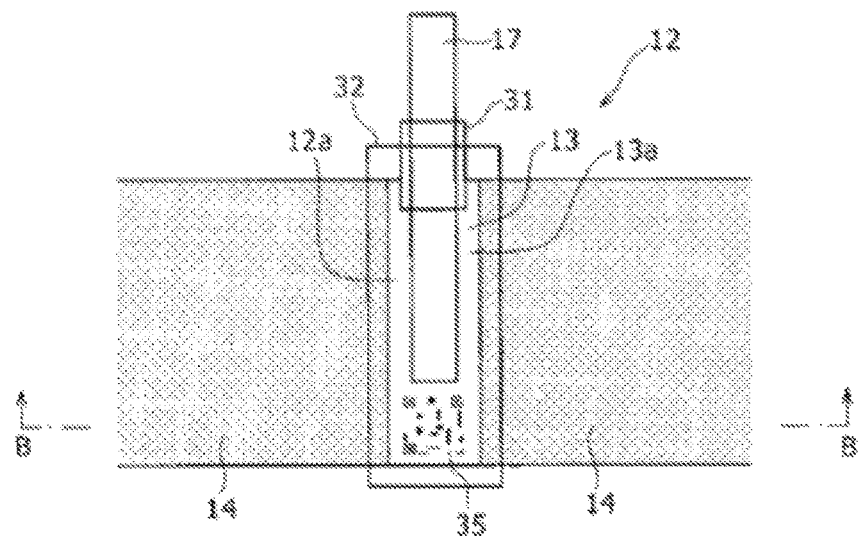
FIG. 4 is an enlarged view of part A in FIG. 2.
Figure 5:
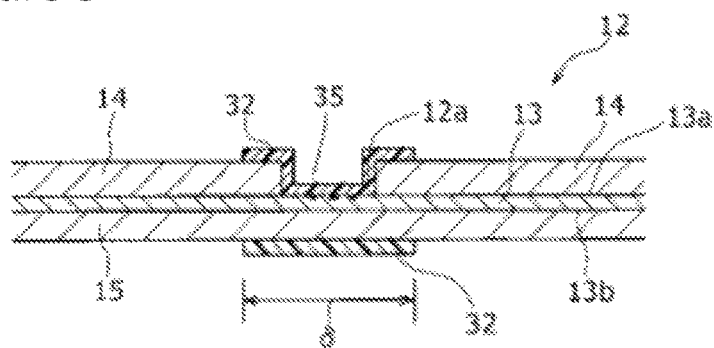
FIG. 5 is a sectional view along B-B in FIG. 4.

FIG. 1 is a sectional view of a battery 10 according to an embodiment. FIG. 2 is a diagram illustrating a positive electrode plate 12 extracted from FIG. 1, in a developed state. FIG. 3 is a diagram illustrating a negative electrode plate 18 extracted from FIG. 1, in a developed state. FIG. 4 is an enlarged view of part A in FIG. 2. FIG. 5 is a sectional view along B-B in FIG. 4.

As illustrated in FIG. 1 as an example, a battery 10 comprises a power generation element including a wound electrode assembly 11 and a non-aqueous electrolyte (not illustrated), and an outer covering can 51. The wound electrode assembly 11 has at least one positive electrode plate 12, at least one negative electrode plate 18 and a separator 25, and the positive electrode plate 12 and the negative electrode plate 18 are spirally wound with the separator 25 therebetween. Each of the positive electrode plate 12 and the negative electrode plate 18 corresponds to an electrode plate. Also, the positive electrode plate 12 corresponds to a first electrode plate and the negative electrode plate 18 corresponds to a second electrode plate. In the below, one side in an axis direction of the electrode assembly 11 may be referred to as "up" or "upper" and the other side in the axis direction of the electrode assembly 11 may be referred to as "down" or "lower". The non-aqueous electrolyte contains a non-aqueous solvent and an electrolyte salt dissolved in the non-aqueous solvent. The non-aqueous electrolyte is not limited to a liquid electrolyte but may be a solid electrolyte using, e.g., a gel polymer.

The positive electrode plate 12 has a band-like positive electrode electrode current collector 13 (FIGS. 2, 4, and 5) and a positive electrode lead 17 joined to the positive electrode electrode current collector 13. The positive electrode lead 17 is a conductive member for electrically connecting the positive electrode electrode current collector 13 and a positive electrode terminal and extends from an upper end of an electrode group toward one side in an axis direction α of the electrode assembly 11 (upward). Here, the electrode group means a part, except leads, of the electrode assembly 11. The positive electrode lead 17 is provided, for example, in a substantially center part in a radial direction β of the electrode assembly 11.

The negative electrode plate 18 has a band-like negative electrode electrode current collector 19 (FIG. 3) and two negative electrode leads 22a, 22b connected to the negative electrode electrode current collector 19. Each of the negative electrode leads 22a, 22b is a conductive member for electrically connecting the negative electrode electrode current collector 19 and a negative electrode terminal and extends from a lower end of the electrode group toward the other side in the axis direction α of the electrode assembly 11 (downward). For example, one negative electrode lead 22a of the two negative electrode leads 22a, 22b is provided in a winding start-side end portion of the electrode assembly 11 and the other negative electrode lead 22b is provided in a winding end-side end portion of the electrode assembly 11.

Each of the positive electrode lead 17 and the negative electrode leads 22a, 22b corresponds to a current collector lead. Each of the positive electrode lead 17 and the negative electrode leads 22a, 22b is a band-like conductive member having a thickness that is larger than that of the corresponding electrode current collector. The thickness of each of the leads is, for example, 3 to 30 times the thickness of the corresponding electrode current collector and is generally 50 to 500 μm. A constituent material of each lead is not specifically limited. The positive electrode lead 17 is preferably formed of a metal containing aluminum as a main component, and each of the negative electrode leads 22a, 22b is preferably formed of a metal containing nickel or copper as a main component or a metal containing both nickel and copper. Note that one negative electrode lead of the negative electrode leads 22a, 22b may be omitted.

In the example illustrated in FIG. 1, a metal battery case that houses the electrode assembly 11 and the non-aqueous electrolyte are formed by the outer covering can 51 and a sealing assembly 52. Insulating plates 53, 54 are provided on an upper side and a lower side of the electrode assembly 11, respectively. The positive electrode lead 17 extends to the sealing assembly 52 side through a through hole of the upper-side insulating plate 53 and is welded to a lower surface of a filter 57, which is a bottom plate of the sealing assembly 52. In the battery 10, a cap 61, which is a top plate of the sealing assembly 52 electrically connected to the filter 57, serves as the positive electrode terminal. On the other hand, the negative electrode lead 22a extends through a through hole of the lower-side insulating plate 54 and is welded to an inner surface of a bottom of the outer covering can 51, and the negative electrode lead 22b extends to the bottom side of the outer covering can 51 through the outer side of the lower-side insulating plate 54 and is welded to the inner surface of the bottom of the outer covering can 51. In the battery 10, the outer covering can 51 serves as the negative electrode terminal.

As described above, the electrode assembly 11 has a wound structure in which the positive electrode plate 12 and the negative electrode plate 18 are spirally wound with the separator 25 therebetween. The positive electrode plate 12, the negative electrode plate 18 and the separator 25 are each formed in a band-like shape and are alternately stacked in the radial direction β of the electrode assembly 11 by being spirally wound. In the electrode assembly 11, a longitudinal direction of each electrode plate is a winding direction γ (FIGS. 2 and 3) and a width direction of each electrode plate is the axis direction α. In FIGS. 2 and 3, each electrode plate is illustrated in a developed state, and the left side in the sheet is the winding start side of the electrode assembly 11 and the right side in the sheet is the winding end side of the electrode assembly 11.

The outer covering can 51 has a bottomed cylindrical metal container. A gasket 62 is provided between the outer covering can 51 and the sealing assembly 52, ensuring sealing of the inside of the battery case. The outer covering can 51 has, for example, a projecting portion 56 that supports the sealing assembly 52, the projecting portion 56 being formed by pressing a side portion of the outer covering can 51 from the outside. The projecting portion 56 is preferably formed in an annular shape along a circumferential direction of the outer covering can 51 and supports the sealing assembly 52 on an upper surface thereof. Consequently, the sealing assembly 52 blocks an opening of the outer covering can 51.

The sealing assembly 52 has the filter 57, a lower vent member 58, an insulating member 59, an upper vent member 60, and a cap 61 stacked in the order mentioned from the electrode assembly 11 side. The members included in the sealing assembly 52 each have, for example, a disk-like shape or a ring-like shape, and the members except the insulating member 59 are electrically connected to one another. The lower vent member 58 and the upper vent member 60 are connected to each other at respective center portions, and the insulating member 59 is interposed between respective circumferential edge portions of the lower vent member 58 and the upper vent member 60. Upon an increase in inner pressure of the battery due to abnormal heat generation, for example, the lower vent member 58 is broken and the upper vent member 60 consequently swells toward the cap 61 side and moves apart from the lower vent member 58, whereby the electrical connection between the lower vent member 58 and the upper vent member 60 is shut off. Upon a further increase in inner pressure, the upper vent member 60 is broken and gas is discharged from an opening 61*a* of the cap 61.

The electrode assembly 11 will be described in detail below with reference to FIGS. 2 to 5. The positive electrode plate 12 has the band-like positive electrode electrode current collector 13 and positive electrode active material layers 14, 15 each formed on the positive electrode electrode current collector 13. In the present embodiment, the positive electrode active material layers 14, 15 are formed on opposite surfaces of the positive electrode electrode current collector 13, respectively. The positive electrode active material layer 14 is formed on a first surface 13*a*, which is a front surface of the positive electrode electrode current collector 13 in the sheet of FIG. 2. The positive electrode active material layer 15 is formed on a second surface 13*b*, which is a rear surface of the positive electrode electrode current collector 13 in the sheet of FIG. 2. In FIGS. 2 and 4, the positive electrode active material layer 14 is illustrated with shading. For the positive electrode electrode current collector 13, for example, a foil of a metal such as aluminum or a film with the metal disposed on a surface layer is used. The positive electrode electrode current collector 13 is preferably a foil of a metal containing an aluminum or an aluminum alloy as a main component. A thickness of the positive electrode electrode current collector 13 is, for example, 10 to 30 μm.

The positive electrode active material layers 14, 15 are preferably formed on an entire area of each of the opposite surfaces of the positive electrode electrode current collector 13 except a later-described electrode current collector exposed part 12*a*. The positive electrode active material layers 14, 15 each preferably include a positive electrode active material, a conductive agent, and a binder. The positive electrode plate 12 is fabricated by applying a positive electrode mixture slurry containing solvents such as a positive electrode active material, a conductive agent, a binder, and N-methyl-2-pyrrolidone (NMP) to each of the opposite surfaces of the positive electrode electrode current collector 13 and then drying and rolling the applied slurry.

An example of the positive electrode active material can be a lithium-containing transition metal oxide containing a transition metal element such as Co, Mn, or Ni. The lithium-containing transition metal oxide is not specifically limited but is preferably a composite oxide represented by general expression $Li_{1+x}MO_2$ (in the expression, $-0.2 < x \leq 0.2$, and M includes at least one of Ni, Co, Mn, and Al).

Examples of the conductive agent include, e.g., carbon materials such as carbon black (CB), acetylene black (AB), ketjen black and black lead. Examples of the binder include, e.g., fluorine-based resins such as polytetrafluoroethylene (PTFE) and polyvinylidene fluoride (PVdF), polyacrylonitrile (PAN), polyimide (PI), acrylic-based resins and polyolefin-based resins. Also, any of these resins, and carboxymethyl cellulose (CMC) or a salt thereof or polyethylene oxide (PEO) may be used together. One of these materials may be used alone or two or more of the materials may be used in combination.

The electrode current collector exposed part 12*a* in which a surface of the metal forming the positive electrode electrode current collector 13 is exposed is provided in the first surface 13*a* of the positive electrode plate 12. The electrode current collector exposed part 12*a* is a part to which the positive electrode lead 17 is connected and is also a part in which the surface of the positive electrode electrode current collector 13 is covered by neither of the positive electrode active material layers 14, 15. The electrode current collector exposed part 12*a* is formed so as to be wider than the positive electrode lead 17. In the example illustrated in FIG. 2, at a center portion in the longitudinal direction of the positive electrode plate 12, the electrode current collector exposed part 12*a* is provided over an entire length in a width direction of the positive electrode electrode current collector 13. Consequently, the electrode current collector exposed part 12*a* is disposed between two parts of the positive electrode active material layer 14 on the opposite sides in the longitudinal direction, at a center portion in a longitudinal direction of the positive electrode electrode current collector 13. The electrode current collector exposed part 12*a* may be formed closer to an end in the longitudinal direction of the positive electrode plate 12 but from the perspective of current collectability, is preferably provided at a position that is substantially equally distant from opposite ends in the longitudinal direction of the positive electrode plate 12. As a result of the positive electrode lead 17 being connected to the electrode current collector exposed part 12*a* provided at such position, when winding is performed to form the electrode assembly 11, the positive electrode lead 17 is disposed at an intermediate position in the radial direction of the electrode assembly 11 so as to project upward from an end surface in the axis direction. The electrode current collector exposed part 12*a* is provided, for example, via intermittent application in which the positive electrode mixture slurry is partly not applied to the positive electrode electrode current collector 13. Note that the electrode current collector exposed part 12*a* may be provided so as to have a length that is short of extending from an upper end to a lower end of the positive electrode plate 12.

As illustrated in FIG. 5, in the second surface 13*b* of the positive electrode electrode current collector 13, the positive electrode active material layer 15 is disposed at a position on the opposite side in the thickness direction of the positive electrode electrode current collector 13 from the electrode current collector exposed part 12*a*. An identification mark part 35 is formed in the electrode current collector exposed part 12*a* and is covered by a second tape 32. The positive electrode lead 17 is joined to the electrode current collector exposed part 12*a*, for example, via, e.g., laser welding or ultrasonic welding. Here, a part of the positive electrode lead 17, the part being led from the positive electrode electrode current collector 13, and a part of the positive electrode lead 17, the part being connected to the positive electrode electrode current collector 13, are covered by a first tape 31 (FIG. 4) and the second tape 32. The first tape 31 is attached to the positive electrode lead 17 in such a manner that the first tape 31 is wound around the part of the positive electrode lead 17, the part being led from the positive electrode electrode current collector 13, and a part of the positive electrode lead 17, the part overlapping with the positive electrode electrode current collector 13. The second tape 32 is provided in such a manner that a part of the positive electrode lead 17, the part overlapping the electrode current collector exposed part 12*a* and including the part with the first tape 31 wound thereon and respective parts of the positive electrode active material layers 14, 15 are sandwiched between two pieces of the second tape 32 from opposite sides in a thickness direction of the positive electrode plate 12 so as to cover the parts. Then, the two pieces of the second tape 32 are bonded to each other at respective parts protruding from opposite ends in a width direction of the positive electrode plate 12 (up-down direction in FIG. 4). Consequently, the second tape 32 is attached to the positive electrode plate 12 so as to cover the electrode current collector exposed part 12*a*. Each of the first tape 31 and the second tape 32 is formed of an insulating material. Each of the tapes 31, 32 is made of, for example, a resin such as polypropylene (PP). The first tape 31 and the second tape 32 can prevent an internal short circuit in a case where the separator 25 between the positive electrode plate 12 and the negative electrode plate 18 is ruptured. Also, the later-described identification mark part 35 formed in the electrode current collector exposed part 12*a* is covered together with the positive electrode lead 17 by the second tape 32. Consequently, damage of the identification mark part 35 can easily be prevented. In FIG. 4, the first tape 31 and the second tape 32 are transparent but may be semi-transparent or opaque.

In the embodiment, the identification mark part 35 that enables identification of manufacturing process history records is formed at a position in the electrode current collector exposed part 12*a*, the position being different from that of the positive electrode lead 17. More specifically, an end (lower end in FIG. 4) of the positive electrode lead 17 is located away from an end in a width direction (lower end in FIG. 4) of the electrode current collector exposed part 12*a*, toward the other side in the width direction (upper side in FIG. 4). Then, the identification mark part 35 is formed in an end portion in the width direction (lower end portion in FIG. 4) of the electrode current collector exposed part 12*a* in which no positive electrode lead 17 is disposed. In FIGS. 2 and 4, as the identification mark part 35, a QR code (registered trademark), which is a two-dimensional code, is illustrated. The identification mark part 35 includes at least one piece of information of, for example, a production facility, a production line, an operator, and a production date as manufacturing process history records. Even if, e.g., most of components of the battery 10 are deformed by the effect of high heat due to an abnormality of the battery 10, the electrode plates inside, such as the positive electrode electrode current collector 13, that are each formed of a metal material are less likely to deform. Therefore, enabling confirmation of the manufacturing process history records at the time of occurrence of a failure in the battery 10 makes it easy to quickly analyze a cause of the failure. Other than a two-dimensional code, the identification mark part may be formed of numbers, characters, or a combination of numbers and characters. Also, the identification mark part may be formed of protrusions, holes, or a combination of protrusions and holes. Also, the identification mark part may be a one-dimensional code such as a bar code.

As described above, in the positive electrode electrode current collector 13, the positive electrode active material layer 15 is disposed at a position on the opposite side in the thickness direction of the positive electrode electrode current collector 13 from the electrode current collector exposed part 12*a*. Consequently, as illustrated in FIG. 5, on the positive electrode electrode current collector 13, the positive electrode active material layer 15 is disposed at a position on the opposite side in the thickness direction of the positive electrode electrode current collector 13 from the identification mark part 35.

Figure 6:
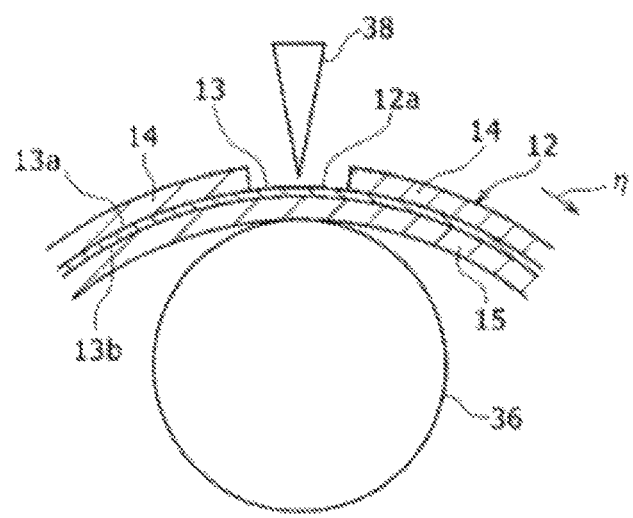
FIG. 6 is a diagram illustrating a method for forming an identification mark on the positive electrode plate illustrated in FIG. 2.

Also, in the embodiment, the identification mark part 35 is formed via laser marking. Laser marking is contactless marking using laser light, generates no static electricity, enables high-speed marking work and is highly durable. FIG. 6 is a diagram illustrating a method for forming an identification mark on a positive electrode plate 12. In forming an identification mark, as illustrated in FIG. 6, a positive electrode plate 12 before provision of a positive electrode lead and an identification mark part is transported in one direction (arrow η direction in FIG. 6) via a roller 36 formed of, e.g., rubber or metal. In this transportation, laser light 38 is applied to an electrode current collector exposed part 12*a* while the electrode current collector exposed part 12*a* is supported by the roller 36 via the positive electrode active material layer 15 on the rear side (lower side in FIG. 6), to form an identification mark part 35 (FIG. 4). As described above, the positive electrode active material layer 15 is disposed on the rear side of the electrode current collector exposed part 12*a*, enabling an increase in stiffness of a part in which an identification mark is formed in the positive electrode plate 12. Consequently, the identification mark can easily be formed with high precision.

Note that the identification mark part is not limited to those formed using laser marking but may be formed by, for example, inkjet printing. In this case, also, in forming an identification mark, a positive electrode active material layer 15 is disposed on the rear side of an electrode current collector exposed part 12*a*, enabling an increase in stiffness in a part in which the identification mark is formed and thus enabling the identification mark to be formed with high precision.

Next, a configuration of the negative electrode plate 18 will be described with reference to FIG. 3. The negative electrode plate 18 has the band-like negative electrode electrode current collector 19 and a negative electrode active material layer 20 formed on the negative electrode electrode current collector 19. In the present embodiment, the negative electrode active material layer 20 is formed on each of opposite surfaces of the negative electrode electrode current collector 19. For the negative electrode electrode current collector 19, for example, a foil of a metal such as copper or a film with the metal disposed on a surface layer is used. A thickness of the negative electrode electrode current collector 19 is, for example, 5 to 30 µm.

The negative electrode active material layer 20 is preferably formed on an entire area of each of the opposite surfaces of the negative electrode electrode current collector 19 except electrode current collector exposed parts 18a, 18b. The negative electrode active material layer 20 preferably contains a negative electrode active material and a binder. The negative electrode plate 18 is fabricated by, for example, applying a negative electrode mixture slurry containing, e.g., a negative electrode active material, a binder, and water to each of opposite surfaces of a negative electrode electrode current collector and then drying and rolling the applied slurry.

The negative electrode active material is not specifically limited as long as the negative-electrode active material can reversely occlude and release lithium ions, and for example, a carbon material such as natural black lead or artificial black lead, a metal that can be alloyed with lithium such as Si or Sn or an alloy containing the metal or a composite oxide can be used. For the binder contained in the negative-electrode active material layer 20, for example, a resin that is similar to any of those for the positive electrode plate 12 is used. Where the negative electrode mixture slurry is prepared using a water-based solvent, e.g., styrene-butadiene rubber (SBR), CMC, or a salt thereof, a polyacrylic acid or a salt thereof or polyvinyl alcohol can be used. One of these materials can be used alone or two or more of the materials can be used in combination.

At opposite end portions in a longitudinal direction, which are a winding start-side end portion and a winding end-side end portion, of the negative electrode plate 18, the electrode current collector exposed parts 18a, 18b in which the metal forming the negative electrode electrode current collector 19 is exposed are provided. The electrode current collector exposed parts 18a, 18b are parts to which the negative electrode leads 22a, 22b are connected, respectively, and are parts in which the surface of the negative electrode electrode current collector 19 is not covered by the negative electrode active material layer 20. The electrode current collector exposed parts 18a, 18b each have a substantially rectangular shape that is long along a width direction of the negative electrode plate 18 in a front view and are formed so as to be wider than the respective negative electrode leads 22a, 22b. The electrode current collector exposed part 18b on the winding-end side of the negative electrode plate 18 is disposed in a part extending over a predetermined width in a longitudinal direction of the negative electrode electrode current collector 19 from one end in the longitudinal direction (right end in FIG. 3) of the negative electrode electrode current collector 19. The electrode current collector exposed part 18a on the winding-start side of the negative electrode plate 18 is disposed in a part extending over a predetermined width in the longitudinal direction of the negative electrode electrode current collector 19 from the other end in the longitudinal direction (left end in FIG. 3) of the negative electrode electrode current collector 19.

In the present embodiment, the two negative electrode leads 22a, 22b are joined to the surface on the outer circumferential side of the negative electrode electrode current collector 19 via ultrasonic welding or laser welding. Upper end portions of the negative electrode leads 22a, 22b are disposed on the electrode current collector exposed parts 18a, 18b, respectively, and lower end portions of the negative electrode leads 22a, 22b extend downward from lower ends of the electrode current collector exposed parts 18a, 18b, respectively.

In the example illustrated in FIG. 3, in the opposite end portions in the longitudinal direction (that is, the winding start-side end portion and the winding end-side end portion) of the negative electrode plate 18, the electrode current collector exposed parts 18a, 18b are provided over an entire length in a width direction of the negative electrode electrode current collector 19, respectively. The negative electrode lead 22a is provided on the electrode current collector exposed part 18a in the winding start-side end portion of the negative electrode plate 18 and the negative electrode lead 22b is provided on the electrode current collector exposed part 18b in the winding end-side end portion of the negative electrode plate 18. As a result of the negative electrode leads 22a, 22b being provided in the opposite end portions in the longitudinal direction of the negative electrode plate 18 in this way, current collectability is enhanced. The negative electrode lead disposition method is not limited to this example but a negative electrode lead 22a may be provided on the winding start-side end portion of the negative electrode plate 18 alone. In this case, the electrode current collector exposed part of the winding end-side end portion is preferably in direct contact with an inner circumferential surface of the outer covering can 51. The electrode current collector exposed parts 18a, 18b are provided, for example, by intermittent application in which the negative electrode mixture slurry is partly not applied to the negative electrode electrode current collector.

As in the case of the positive electrode plate 12, a first tape 40 (see FIGS. 7 and 8) is attached to each of parts of negative electrode leads 22a, 22b, and as in the case of the positive electrode plate 12, a second tape 42 is attached to each of parts of the negative electrode plate 18 so as to cover the electrode current collector exposed parts 18a, 18b. In FIG. 3, illustration of the first tapes attached to the negative electrode leads 22a, 22b is omitted.

Referring back to FIG. 1, for the separator 25, a porous sheet having ion permeability and an insulation property is used. Specific examples of the porous sheet include, e.g., a microporous thin film, a woven fabric, and a non-woven fabric. A material of the separator 25 is preferably an olefin resin such as polyethylene or polypropylene. A thickness of the separator 25 is, for example, 10 to 50 μm.

With the positive electrode plate 12, the electrode assembly 11 and the battery 10 described above, regardless of stiffness of the electrode current collector of the positive electrode plate 12, disposing the positive electrode active material layer 15 on the opposite side of the positive electrode plate 12 from the identification mark enables an increase in stiffness of the part in which the identification mark is formed. Consequently, the identification mark can be formed with high precision. Therefore, at the time of occurrence of a failure in a manufacturing process of the battery 10 or after shipment of the battery 10, the identification mark can easily be confirmed. For example, where the identification mark part 35 is a two-dimensional code or a one-dimensional code, the manufacturing history records can quickly be confirmed by reading the code using a reading device. Consequently, analysis of a cause of the failure can quickly be performed based on the identification mark. On the other hand, in the configuration described in Patent Literature 1, on the electrode current collector of the negative electrode plate, no negative electrode active material layer is disposed at a position on the opposite side in a thickness direction of the electrode current collector from the identification mark. Consequently, stiffness of a part in which the identification mark is formed is low. Therefore, in the configuration described in Patent Literature 1, the identification mark may fail to be formed with high precision.

Also, according to the embodiment, as a result of the positive electrode active material layer 15 being disposed on the rear side (lower side in FIG. 6) of the electrode current collector exposed part 12a, laser light can easily be prevented from penetrating through the positive electrode plate 12 in the thickness direction of the positive electrode plate 12. Also, subject products each having a cause of a failure can quickly be selected. Also, in reality, for example, a plurality of positive electrode plates 12 are obtained by cutting a positive electrode plate hoop and position information pieces indicating positions in the positive electrode plate hoop from which the respective positive electrode plates 12 were cut out can be tracked on the electrode plate-by-electrode plate basis from respective identification mark parts 35 (the same applies to the negative electrode plate). Also, information is shared by association between at least one of the positive electrode plate 12, the electrode assembly 11, and the battery 10 of the embodiment and a manufacturing execution system (MES) that performs product quality management, manufacturing management, etc., in a production system of the product, enabling streamlining of the production system. Note that for the identification mark parts, a same one can be used for a group that is a predetermined lot of positive electrode plates 12. For example, the identification mark parts may be a lot ID set on a lot-by-lot basis.

Figure 7:
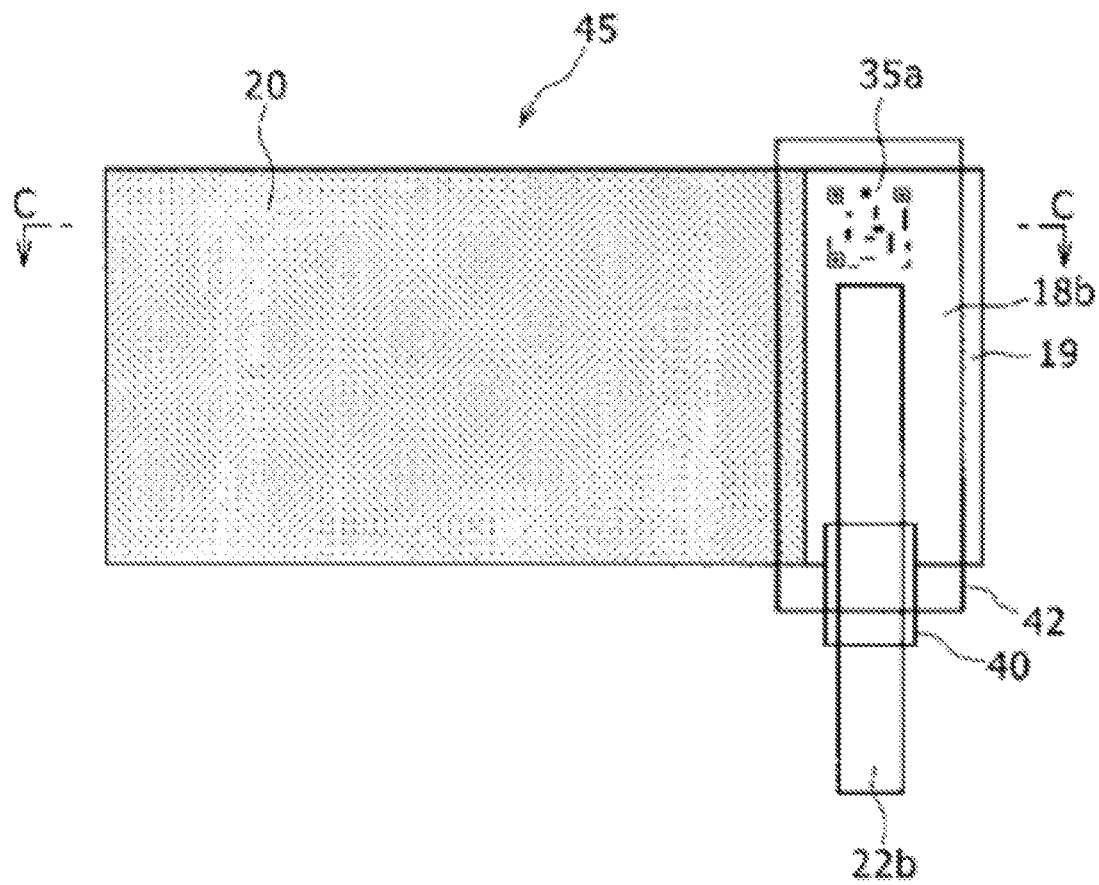
FIG. 7 is a diagram illustrating a winding end-side end portion of a negative electrode plate in a battery according to another example of the embodiment.
Figure 8:
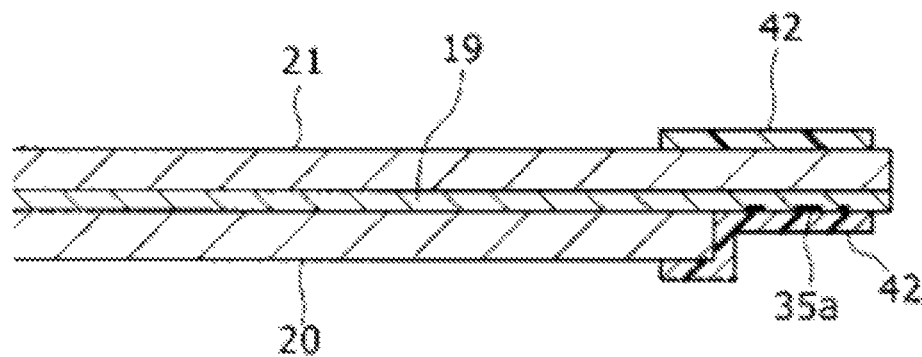
FIG. 8 is a sectional view along C-C in FIG. 7.

FIG. 7 is a diagram illustrating a winding end-side end portion of a negative electrode plate 45 in a battery according to another example of the embodiment. FIG. 8 is a sectional view along C-C in FIG. 7.

In the case of the configuration in the present example, no identification mark part is formed on an electrode current collector exposed part of a positive electrode plate. On the other hand, an identification mark part 35a that enables identification of manufacturing process history records is formed on an upper end portion of an electrode current collector exposed part 18b in a winding end-side end portion of a negative electrode plate 45, the upper end portion being a position that is different from that of a negative electrode lead 22b. More specifically, one end (upper end in FIG. 7) of the negative electrode lead 22b is located away from one end in a width direction (upper end in FIG. 7) of the electrode current collector exposed part 18b, toward the other side in the width direction (lower side in FIG. 7). Then, an identification mark part 35a is formed on one end portion in the width direction (upper end portion in FIG. 7) of the electrode current collector exposed part 18b in which the negative electrode lead 22b is not disposed. The identification mark part 35a is similar to the identification mark part 35 formed on the positive electrode plate 12 in the configuration in FIG. 4. As in the configuration in FIGS. 1 to 6, the identification mark part 35a is not limited to a two-dimensional code but may be formed of numbers, characters, or a combination of numbers and characters. Also, the identification mark part may be formed of protrusions, holes, or a combination of protrusions and holes. Also, the identification mark part may be a one-dimensional code such as a bar code. In the present example, the negative electrode plate 45 corresponds to a first electrode plate and the positive electrode plate corresponds to a second electrode plate.

Also, on the negative electrode electrode current collector 19, a negative electrode active material layer 21 (FIG. 8) is disposed at a position on the opposite side in a thickness direction of the negative electrode electrode current collector 19 from the electrode current collector exposed part 18b. Consequently, on the negative electrode electrode current collector 19, the negative electrode active material layer 21 is disposed at a position on the opposite side in the thickness direction of the negative electrode electrode current collector 19 from the identification mark part 35a. Furthermore, the identification mark part 35a is covered together with the negative electrode lead 22b by a second tape 42 attached to the negative electrode plate 45.

In the case of the negative electrode plate 45 above, also, as in the case of the positive electrode plate 12 in FIGS. 1 to 6, stiffness of a part in which the identification mark is formed in the negative electrode plate 45 can be enhanced, and thus, the identification mark can easily be formed with high precision. Consequently, at the time of occurrence of a failure, the identification mark can easily be confirmed, enabling quickly performing analysis of a cause of the failure based on the identification mark. In the present example, the other configuration and operation are similar to those of the configuration in FIGS. 1 and 6.

Note that in the configuration in FIGS. 7 to 8, the identification mark part may be formed not on the winding end-side end portion of the negative electrode plate 45 but on an electrode current collector exposed part of a winding start-side end portion. Also, as another example of the embodiment, an electrode assembly and a battery may have a configuration in which an identification mark part is formed on each of electrode current collector exposed parts of both a positive electrode plate and a negative electrode plate. In this case, individual manufacturing history records of the positive electrode plate and the negative electrode plate may be made identifiable from the respective identification mark parts.

Note that as a reference example, the positive electrode plate 12 illustrated in FIGS. 2, 4 and 5 may have a configuration in which no active material layer is disposed at a position on the opposite side in the thickness direction of the positive electrode electrode current collector 13 from the electrode current collector exposed part 12a on which the positive electrode lead 17 and the identification mark part 35 are disposed. For example, an electrode current collector exposed part may be formed in an area in the width direction (right-left direction in FIG. 5) that is the same as the area in the width direction of the electrode current collector exposed part 12a (area indicated by arrow 8 in FIG. 5), in the second surface 13b that is the surface on the opposite side of the positive electrode plate 12 from the positive electrode lead 17. In this case, although stiffness of a part on which an identification mark is formed in the positive electrode plate is lower than that of the configuration in FIGS. 1 to 6, in a state of an electrode assembly in which the positive electrode plate is wound, the electrode current collector exposed part on which an identification mark part is disposed in an intermediate portion in a radial direction of the inside of the electrode assembly. Consequently, the effect of damage of the identification mark part being less likely to occur even at the time of occurrence of a failure in the battery can be obtained.

REFERENCE SIGNS LIST 10 battery
11 electrode assembly
12 positive electrode plate
12a electrode current collector exposed part
13 positive electrode electrode current collector
13a first surface
13b second surface
14, 15 positive electrode active material layer
17 positive electrode lead
18 negative electrode plate
18a, 18b electrode current collector exposed part 19 negative electrode electrode current collector
20, 21 negative electrode active material layer
22a, 22b negative electrode lead
25 separator
31 first tape
32 second tape
35, 35a identification mark part
36 roller
38 laser light
40 first tape
42 second tape
45 negative electrode plate
51 outer covering can
52 sealing assembly
53, 54 insulating plate
56 projecting portion
57 filter
58 lower vent member
59 insulating member
60 upper vent member
61 cap
62 gasket

The invention claimed is:

1. A method of manufacturing an electrode plate, the method comprising:
providing a band-like electrode current collector;
forming an active material layer on each of opposite surfaces of the electrode current collector with an exposed part in which the electrode current collector is exposed;
connecting a current collector lead to the exposed part; and
forming, after formation of the active material layer and the exposed part of the electrode current collector, an identification mark part that enables identification of a manufacturing process history record at a position in the exposed part, the position being different from that of the current collector lead,
wherein:
the exposed part has a rectangular shape and is disposed in a part in a longitudinal direction of the electrode current collector;
on the electrode current collector, the active material layer is disposed at a position on an opposite side in a thickness direction of the electrode current collector from the identification mark part;
the current collector lead and the identification mark part are disposed so as to be aligned in a longitudinal direction of the exposed part;
after the formation of the active material layer and the exposed part of the electrode current collector, the electrode current collector is conveyed on a roller disposed opposite a marker configured to form the identification mark part on the exposed part; and
during formation of the identification mark part, the exposed part has a first side thereof directly facing the marker and a second side opposite the first side thereof supported by the roller via the electrode active material layer interposed between the exposed part and the roller, wherein the electrode current collector, while supported on the roller, forms a curved configuration along the roller, wherein in the curved configuration the exposed part protrudes toward the marker during formation of the identification mark part,
the method further comprising:
attaching a pair of tapes to opposite sides of the electrode current collector, wherein the pair of tapes is configured to sandwich therebetween the current collector lead, the identification mark part, the exposed part, and an edge of the active material layer adjacent to the exposed part together in the thickness direction of the electrode current collector.

2. A method of manufacturing an electrode assembly, the method comprising:
providing at least one positive electrode plate and at least one negative electrode plate that are wound with a separator therebetween,
wherein the positive electrode plate is the electrode plate according to claim 1; and
the exposed part of the positive electrode plate is disposed in an intermediate portion in the longitudinal direction of the electrode current collector of the positive electrode plate, between two positive electrode active material layers on opposite sides in the longitudinal direction, the two positive electrode active material layers being included in the active material layer.

3. A method of manufacturing an electrode assembly, the method comprising:
providing at least one positive electrode plate and at least one negative electrode plate that are wound with a separator therebetween,
wherein the negative electrode plate is the electrode plate according to claim 1; and
the exposed part of the negative electrode plate is disposed in a part extending over a predetermined width in the longitudinal direction of the electrode current collector of the negative electrode plate from one end in the longitudinal direction of the electrode current collector of the negative electrode plate.

4. The method of manufacturing the electrode plate according to claim 1, wherein the identification mark part includes a number, a character, or a combination of a number and a character.

5. The method of manufacturing the electrode plate according to claim 1, wherein the identification mark part includes a protrusion, a hole, or a combination of a protrusion and a hole.

6. The method of manufacturing the electrode plate according to claim 1, wherein the identification mark part is a one-dimensional code or a two-dimensional code.

7. The method of manufacturing the electrode plate according to claim 1, wherein the identification mark part is formed via laser marking.

8. The method of manufacturing the electrode plate according to claim 1, wherein the identification mark part is formed via inkjet printing.

9. A method of manufacturing a battery, the method comprising:
providing an electrode assembly, wherein the electrode assembly is produced by:
providing at least one positive electrode plate and at least one negative electrode plate that are wound with a separator therebetween, wherein at least one of the positive electrode plate and the negative electrode plate is the electrode plate according to claim 1; and
providing a bottomed tubular outer covering can that receives the electrode assembly.

10. A method of manufacturing an electrode assembly, the method comprising:
providing a positive electrode plate and a negative electrode plate that are wound with a separator therebetween, wherein each of the positive electrode plate and the negative electrode plate is the electrode plate according to claim 1, wherein the identification mark parts of the positive electrode plate and the negative electrode plate represent individual manufacturing history records of the positive electrode plate and individual manufacturing history records of the negative electrode plate, respectively, which are different from each other.

11. A method of manufacturing an electrode assembly, the method comprising:
providing at least one positive electrode plate and at least one negative electrode plate that are wound with a separator therebetween, wherein each of the positive electrode plate and the negative electrode plate is the electrode plate according to claim 1; and
the identification mark parts of the positive electrode plate and the negative electrode plate represent individual manufacturing history records of the positive electrode plate and individual manufacturing history records of the negative electrode plate, respectively, which are different from each other.

12. The method of manufacturing the electrode plate according to claim 1, wherein the marker is selected from the group consisting of a laser marker and an inkjet printer.

13. The method of manufacturing the electrode plate according to claim 1, wherein the formation of the identification mark part on the exposed part takes place before provision of the current collector lead to the exposed part.

14. The method of manufacturing the electrode plate according to claim 1, wherein the current collector is provided as an electrode plate hoop configured to be transported on the roller, wherein the electrode plate hoop is cut into the electrode plate after the formation of the identification mark part.

* * * * *